L. R. OAKES.
AUTOMATIC WATERING FOUNTAIN.
APPLICATION FILED JULY 16, 1918.
1,290,775.
Patented Jan. 7, 1919.
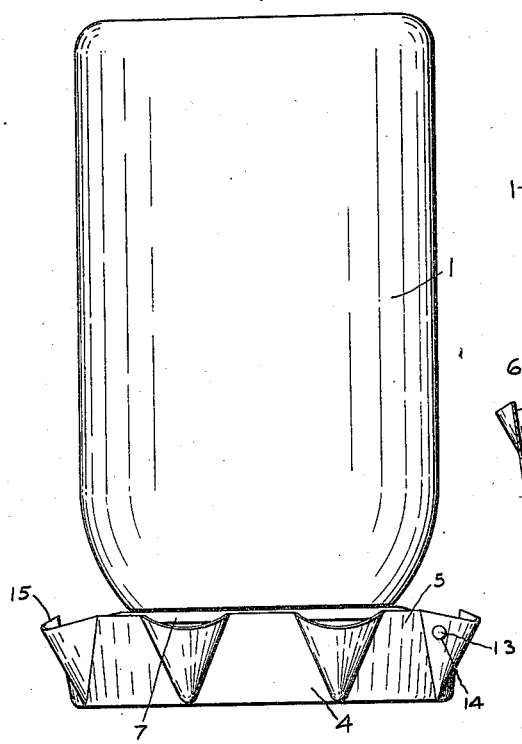
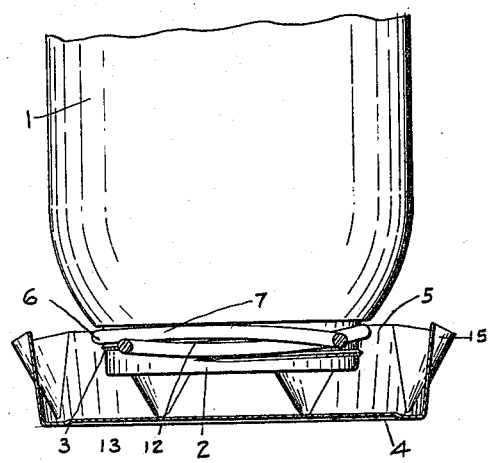
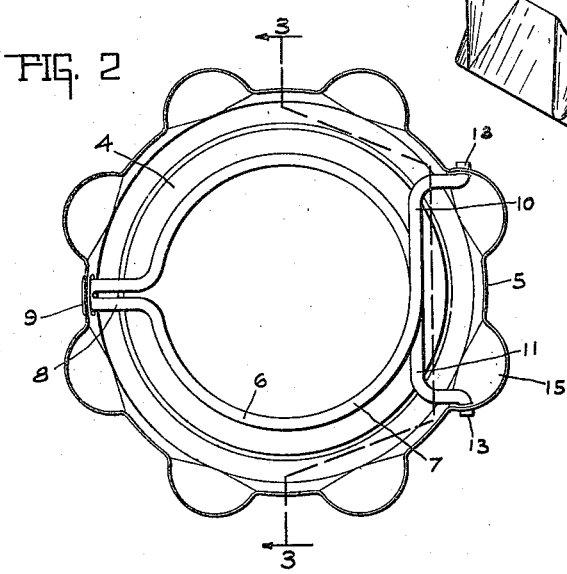
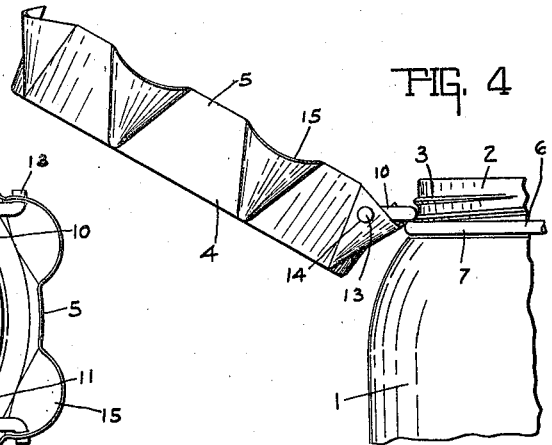
INVENTOR
LUCIAN R. OAKES.
BY
Lockwood & Lockwood
ATTORNEYS

UNITED STATES PATENT OFFICE.

LUCIAN R. OAKES, OF TIPTON, INDIANA, ASSIGNOR TO OAKES MANUFACTURING COMPANY, OF TIPTON, INDIANA, A CORPORATION OF INDIANA.

AUTOMATIC WATERING-FOUNTAIN.

1,290,775. Specification of Letters Patent. Patented Jan. 7, 1919.

Application filed July 16, 1918. Serial No. 245,154.

*To all whom it may concern:*

Be it known that I, LUCIAN R. OAKES, a citizen of the United States, and a resident of Tipton, county of Tipton, and State of Indiana, have invented a certain new and useful Automatic Watering-Fountain; and I do hereby declare that the following is a full, clear, and exact description thereof, reference being had to the accompanying drawings, in which like numerals refer to like parts.

This invention relates to watering fountains and is designed primarily for watering small fowl, although it can be used for watering fowl or animals of any nature. The prime feature of the invention is the provision of a water receptacle and a dispensing trough or pan, the receptacle being suspended above the trough and having its open lower end below the upper edge of the trough so as to form a seal, and preventing the escape of the water from the receptacle except as it is consumed.

A further feature of the invention is the provision of a means for supporting the receptacle in position above the trough, the supporting member being hinged at one end to a part of the trough, while the opposite end of the supporting means is formed into a latch which coöperates with a catch on parts of the trough, the catch normally holding the supporting member and receptacle against hinging movement but permitting the trough to be swung laterally when the latch end of the support is disengaged from the trough, as when the receptacle is being replenished with water.

The receptacle preferably consists of an ordinary glass jar, such as used for canning purposes, and the support is preferably constructed of wire, and parts thereof overlapped so as to provide a groove for engagement with the threads upon the top end of the can, thus positively securing the receptacle to the support.

An additional feature of the invention is the provision of a plurality of convolutions in the vertical edge of the trough or pan, so that the small fowl can readily obtain the water.

In the accompanying drawings which are made a part of this application,

Figure 1 is a side elevation of the fountain, complete and ready for use. Fig. 2 is a top plan view of the trough or pan with the water containing receptacle removed. Fig. 3 is a sectional view as seen on line 3—3, Fig. 2, showing the receptacle in position upon its support. Fig. 4 is a fragmentary elevation showing the trough or pan swung from over the top of the receptacle, whereby water can be readily introduced into the receptacle.

Referring to the drawings, 1 indicates the receptacle proper, which in this instance comprises a glass jar of the usual construction, the neck portion 2, thereof, having threads 3 on the exterior thereof, as is usual.

In applying the receptacle or jar to use, it is first filled with water and then inverted over a trough or pan 4, which is preferably circular, although it may be made in any preferred shape, the open end of the neck portion 2 extending a distance below the upper edge of the vertical flange 5 of the pan so that a seal will be formed for preventing the water from leaving the receptacle except as it is consumed.

The receptacle is supported above the trough 4 by means of a frame 6, which is preferably formed from a piece of wire and bent to form a circular ring 7, parts of the ring portion being pinched together to form a latch 8, which is adapted to snap into a catch or keeper 9, formed in the vertical wall 5 of the pan.

The free ends 10 and 11 of the frame 6 cross each other at a point diametrically opposite the latch portion 8, and these overlapped portions form a recess or groove 12, which engage with the threads 3 on the neck portion of the receptacle, and as the ring member 7 closely fits the neck portion 2, the receptacle may be given a screw action in order to securely attach the receptacle to the supporting frame. The ends 10 and 11 terminate in crank portions 13 which engage holes 14 in parts of the wall of the trough 4 and form a hinge connection between the frame 6 and the trough. The vertical wall 5 is provided at intervals with tapered convolutions 15, the top edges of which are slightly lower than the top edge of the wall, so that the small chicks or other fowl can readily reach the water within the trough.

Before applying the device to use, the trough or pan 4 is swung to the position shown in Fig. 4, and the receptacle filled with water, after which the pan is swung to a closed position and latch 8 engaged with keeper 9. The receptacle is then quickly inverted and the trough or pan rested upon the floor or other suitable point, a sufficient amount of the water leaving the receptacle to properly fill the pan. When all of the water has been consumed from the receptacle and trough, the receptacle is again turned to upright position and the latch disengaged from the keeper 9, and the trough again swung to an open position, when the same operation as previously described, is repeated. If it is desired to remove the receptacle from the pan, rotating motion is imparted thereto to unscrew the neck of the receptacle from the frame 6. And likewise, when the receptacle is being attached to the support, it is rotated in the opposite direction, thus causing the threads to engage between the overlapped ends of the frame, the turning motion being continued until the thread on the neck of the receptacle brings the frame into engagement with the shoulder on the receptacle. By attaching the receptacle to the frame in this manner, it is securely held against any lateral swinging movement which might tend to cause an undue amount of the water to leave the receptacle. This device can be very cheaply constructed, and by careful handling, it is practically indestructible from use.

The invention claimed is:

1. In a watering fountain the combination with a receptacle, of a trough, and a frame formed from a section of wire, said wire being looped upon itself to form a ring section for the reception of the receptacle, said looped portions being crossed and overlapped adjacent their free ends to form threads, the extreme free ends of the wire being bent crank shaped and extended through the wall of the trough for hingedly engaging the frame with the trough.

2. In a watering fountain, the combination with a receptacle open at one end, and threads exteriorly of the open end of the receptacle, of a trough adapted to receive the open end of the receptacle and form a seal, a wire frame having its end entered through the wall of the trough for hingedly securing the frame to the trough, and threads formed by crossing parts of the frame for engagement with the threads of the receptacle, to retain the receptacle in position on the frame.

3. In a watering fountain, the combination with a receptacle having threads thereon, and a trough into which the threaded end of the receptacle is introduced, of a frame for supporting the threaded end of the receptacle a distance from the bottom of the trough, said frame having a ring section and threads formed by overlapping portions of the frame for engagement with the threads on the receptacle.

4. In a watering fountain, the combination with a receptacle having threads thereon, and a trough, into which the threaded end of the receptacle is introduced, of a frame for supporting the threaded end of the receptacle a distance from the bottom of the trough, said frame comprising a section of wire parts of which are bent to form a ring section and having overlapping portions forming threads for engagement with the threads on the receptacle, said overlapping portions terminating in crank portions, said crank portions extending through the wall of the trough for hingedly connecting the frame to said trough, a latch formed from parts of the frame, and a keeper on the trough with which said latch engages.

In witness whereof, I have hereunto affixed my signature.

LUCIAN R. OAKES.

Copies of this patent may be obtained for five cents each, by addressing the "Commissioner of Patents, Washington, D. C."